United States Patent [19]

Narita et al.

[11] 4,074,864
[45] Feb. 21, 1978

[54] METHOD FOR PRODUCING POLYCARBONATE POWDER FROM A POLYCARBONATE SOLUTION

[75] Inventors: Yoshihiro Narita, Sodegaura; Shigeaki Mochizuki; Shigeru Kakimoto, both of Tokuyama; Norio Komori, Sodegaura; Kiyoshi Watanabe, Sodegaura; Hideji Shiota, Sodegaura, all of Japan

[73] Assignee: Idemitsu Kosan Co., Ltd., Tokyo, Japan

[21] Appl. No.: 791,521

[22] Filed: Apr. 27, 1977

Related U.S. Application Data

[63] Continuation of Ser. No. 618,427, Oct. 1, 1975, abandoned.

[30] Foreign Application Priority Data

Oct. 5, 1974 Japan ............................ 49-114851

[51] Int. Cl.² ........................................... B02C 13/10
[52] U.S. Cl. ................................. 241/23; 264/5; 264/9
[58] Field of Search .............. 264/5, 9; 241/65, 236, 241/23; 259/192

[56] References Cited

U.S. PATENT DOCUMENTS

| 2,677,504 | 5/1954 | Klingel | 241/23 |
| 3,917,507 | 11/1975 | Skidmore | 259/192 |
| 4,025,058 | 5/1977 | Mizuguchi | 259/192 |

Primary Examiner—Robert F. White
Assistant Examiner—James R. Hall
Attorney, Agent, or Firm—Flynn & Frishauf

[57] ABSTRACT

A method of producing polycarbonate powder comprises continuously mixing and kneading a polycarbonate solution while heating same, the kneading being accomplished by producing a limited "to and fro" movement of the polycarbonate solution with the aid of a set of spiral blades mounted on rotating shafts in an elongated barrel.

8 Claims, 4 Drawing Figures

METHOD FOR PRODUCING POLYCARBONATE POWDER FROM A POLYCARBONATE SOLUTION

This is a continuation, of application Ser. No. 618,427, filed Oct. 1, 1975 now abandoned.

BACKGROUND OF THE INVENTION

1. Field of the Invention

The present invention relates to a method of continuous production of polycarbonate powder, and more particularly to a process of producing polycarbonate powder from a polycarbonate solution by concentrating and gelling the polycarbonate solution, powdering the gelled solid polycarbonate, and then grinding and drying the obtained polycarbonate powder in a single processing zone.

2. Description of the Prior Art

Heretofore, various methods of preparing polycarbonate powder have been known. One known method comprises extruding melting polycarbonate after the solvent has been eliminated by heating a polycarbonate solution and then grinding the extruded material (Japanese Patent Publication Nos. 22,890/1961 and 24,724/1963). Another known method is where gelation is achieved in a solvent or hot water and then the obtained gell is kneaded to form a powder (Japanese Patent Publication Nos. 21,033/1961, 11,031/1969 and 9,875/1970). A still further known method is where a polycarbonate solution and a steam mixture are brought into a turbulence zone (Japanese Patent Publication Nos. 3,533/1965 and 9,843/1965).

The known methods described above require a special apparatus for each process step such as concentration of a polycarbonate solution, powdering, grinding and drying. Therefore, they have such defects as difficulty in performing the processes in a short period of time and difficulty in preparing good quality powder, due to incomplete elimination of solvent or moisture.

SUMMARY OF THE INVENTION

It is an object of this invention to provide a process for producing polycarbonate powder from a polycarbonate solution in a continuous manner.

It is another object of this invention to provide a process for producing polycarbonate powder having suitable grain size and bulk density for further processing.

According to the present invention, precipitant or water is not necessary and drying of the powder is very easily accomplished. The improvement of this invention comprises carrying out the following steps in a single processing zone: concentrating a polycarbonate solution, powdering a polycarbonate, grinding the polycarbonate and drying the polycarbonate. Limited "to and fro" movement is imparted to the materials in part of the processing zone.

DESCRIPTION OF THE PREFERRED EMBODIMENTS

According to the present invention, a continuous process of producing polycarbonate powder from a polycarbonate solution comprises performing in a single zone the concentration of a polycarbonate solution, and powdering, grinding and drying of the concentrated polycarbonate solution. This is achieved by mixing and kneading a polycarbonate solution while heating same and by simultaneous repeating feeding the solution forward and backward with the aid of a first set of spiral blades oriented for sending the solution forward and a second set of spiral blades oriented for sending the solution in the backward direction. This produces a limited "to and fro" action of material.

The present invention can be practiced advantageously by using an elongated horizontal hollow barrel having a part-cylindrical jacketed base in which two shafts rotate in opposite directions relative to each other. The shafts are provided with meshing spiral blades which are used for feeding the solution forward and backward in the barrel. More precisely, the jacket of the jacketed base is for heating the solution in the barrel. The barrel has an inlet at one end portion for supplying a polycarbonate solution and an outlet for discharging produced polycarbonate powder at the other end portion. In the barrel, two generally parallel shafts are rotating toward each other as seen from the top. The improvement of the present invention is that the parts of said shafts in the area of the inlet of the barrel (i.e., the "forward" part of the barrel) have meshing spiral blades which are oriented for feeding polycarbonate solution in the forward direction so as to transfer polycarbonate solution to the rear part of the barrel with the cooperative action of said shafts. The other parts of the shafts have substantially the same number of spiral blades directed for feeding the solution forward toward the outlet and those for feeding the solution backward toward the inlet. The spiral blades of one shaft cooperatively mesh with those of the other shaft.

The apparatus generally described above is designed to transfer the materials fed into the inlet through the barrel by the action of the spiral blades which are directed for feeding the material in the forward direction with sufficient extrusion power and at the same time to cause counter flow against transferring of fed materials by the spiral blades for feeding material backward. Thus, by the action of the above spiral blades, limited "to and fro" movement is imparted to the materials and thus, forced mixing and kneading of the fed materials is achieved. The product is discharged at the outlet by the extrusion power imparted to the materials fed in from the inlet.

Figure 1:
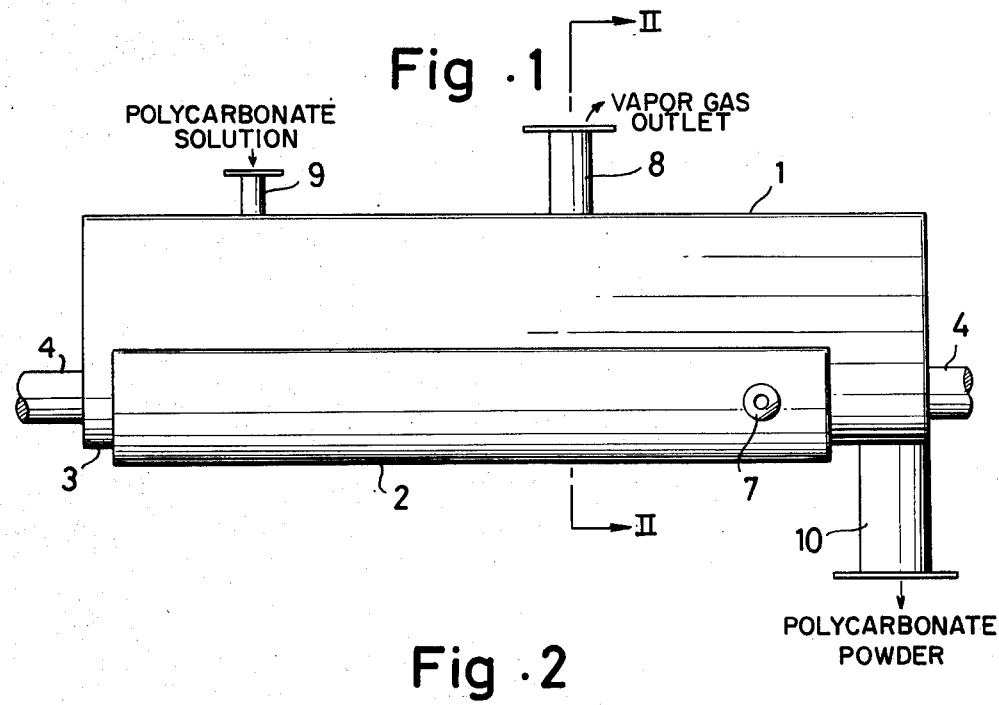
FIG. 1 illustrates a side view of an embodiment of the apparatus of this invention.
Figure 2:
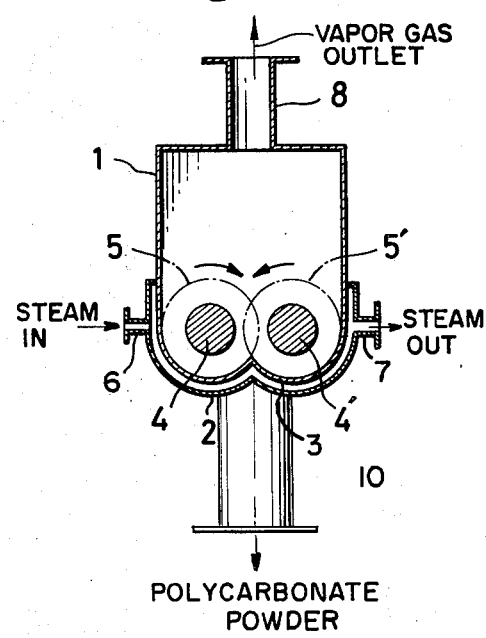
FIG. 2 illustrates a sectional view from the front of an embodiment of the apparatus of this invention.

Referring to FIGS. 1 and 2, an embodiment of the invention comprises a part-cylindrical barrel 1 which is elongated and which has a heating jacket 2 around its base portion to form a jacketed base 3. The barrel 1 has an inlet 9 for a polycarbonate solution. As best seen in FIG. 2, left and right shafts 4,4' are rotatably mounted in the barrel 1 and both ends of the shafts come out of the barrel so as to be rotatably driven. The shafts 4,4' have intermeshing spiral blades 5,5', which will be described in detail later, thereon. Attached to the heating jacket 2 are an inlet 6 and an outlet 7 for a heating medium. The barrel 1 has an outlet 8 at an upper portion thereof for discharging the vapor of the solvent produced upon heating of the polycarbonate solution by the heating medium in the jacket 2.

Figure 3:
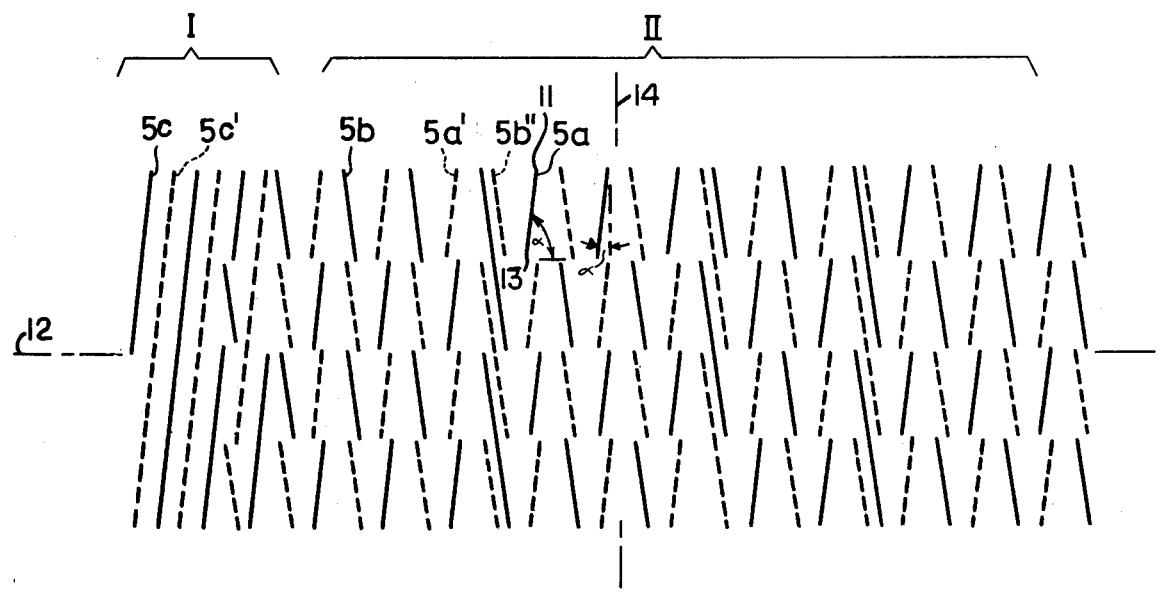
FIG. 3 illustrates a development view showing positions of spiral blades on right and left shafts of the apparatus.
Figure 4:
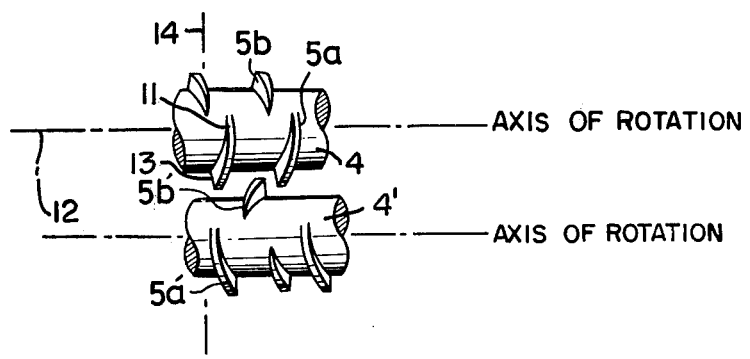
FIG. 4 illustrates an oblique projection showing a part of the spiral blades of the apparatus.

Referring to FIGS. 3 and 4, spiral blades 5a, 5b, 5c are attached to shaft 4, and spiral blades 5a', 5b', 5c' are attached to shaft 4'. Spiral blades 5c,5c' intermesh and feed material forward (i.e., to the right in FIGS. 3 and 4) so as to transfer the fed materials with extrusion power to the outlet 10. Spiral blades 5b,5b' are directed so to transfer the fed materials backward toward the inlet 9 and blades 5a,5a' are directed to transfer the material forward toward the outlet 10. FIG. 3 is a development view of the spiral blades which are attached to the shafts 4,4', the development view being made along tips of the blades. In FIG. 5 the spiral blades 5a,5b,5c attached to the shaft 4 are indicated by solid lines and the spiral blades 5a',5b',5c' attached to the shaft 4' are indicated by dotted lines which are developed inversely. Among those spiral blades indicated by solid lines or dotted lines, the lines rising toward the right represent the spiral blades for feeding material forward (5c,5c', 5a, 5a') and the lines rising toward the left represent spiral blades for feeding material backward (5b,5b').

The manner in which the spiral blades are directed on both shafts 4,4' is shown in FIG. 3, wherein the front parts I close to the forward ends of the shafts are for feeding material forward (5c,5c'), and the remaining parts II of the spiral blades of both shafts 4,4' are generally arranged to form parts for feeding material forward (5a,5a') and those for feeding material backward (5b,5b').

As a result of the arrangement described above, in part I of the blades (FIG. 3) all the materials are fed or forced towards the outlet 10, while in the part II of the blades the simultaneous action of feeding forward and backward is carried out to provide kneading action. As a whole, the materials move towards the outlet 10 under the influence of the "extrusion power" developed by the spiral blades 5c5c' in part I of the blades. In part I of the spiral blades it is desirable to also attach blades for feeding backward at proper positions in order to prevent holding of polycarbonate. However, these blades are not essential parts of the present invention.

In part II of the blades (FIG. 3), sufficient action of mixing and kneading of the polycarbonate solution fed to part II is provided, and evaporation of solvent in the polycarbonate solution and powdering of the polycarbonate is promoted. In addition, grinding and drying of the produced polycarbonate powder are also performed in the same part II of the blades under the influence of the action of spiral blades 5a,5a',5b,5b'.

In the development view as shown in FIG. 3, the mode of attachment of blades for feeding forward and blades for feeding backward in the part II is generally to form a pair between blades for feeding forward and those for feeding backward. These pairs of blades gear or intermesh with each other throughout part II. However, the present invention is not limited to this mode of attachment. If almost the same numbers of spiral blades for feeding forward and those for feeding backward are attached to the shafts 4,4' gear or intermesh each other, the spiral blades for feeding forward and for feeding backward may be attached to the two shafts shafts 4,4' at any place. Furthermore, it is possible to attach blades for feeding forward to one shaft and to attach those for feeding backward to the other shaft. Moreover, it is possible to attach blades for feeding forward and for feeding backward alternately to one shaft and to attach blades in a similar manner to the other shaft, the blades of the two shafts meshing with each other. A combination of the modes of attachment of the blades described above is also possible.

Blades attached to shafts 4,4' can be arranged on the shafts continuously. They can also be composed of numerous small blades. As seen in FIGS. 3 and 4. A preferred arrangement of blades is an alternate attachment of blades for feeding forward and those for feeding backward to one shaft where the angle α of the blades extending between the beginning point 11 and the tip point 13, relative to the axis of rotation 12 of the shaft 4 is from 30° to 150° and to the other shaft a similar arrangement of blades to the above is made. The blades of each shaft intermesh with each other.

As a result of the arrangement described above, sufficient mixing is provided. As described above, self-cleaning can also be provided by intermeshing the blades.

In addition, it is preferable that the spiral blades be arranged at proper positions on the shafts in order to partly prevent a regularity of combinations of blades for feeding forward and those for feeding backward. Also the angle α between the beginning point 11 of the blades and the tip point 12 of the blades, relative to the axis of rotation 12 of the blades is preferably more than 90° as shown in FIG. 3. Such an arrangement enables obtaining uniform grain size of the produced powder even when the feeding rate of the polycarbonate solution may vary. Furthermore, the holding time of the produced powder in the apparatus can be controlled and thus the mixing and kneading action can also be controlled.

As described above, the spiral blades may be attached to shafts continuously along the periphery or by dividing them into many small parts. The angle α between the beginning point of the blades and the axis of rotation at the tip point may take more than 360° or 90° to 360° and the numbers of blades may be varied.

The angle β between the blades and a plane 14 (FIGS. 3 and 4) perpendicular to the axial direction of the shafts (lead angle) is preferably 5° to 30°.

The clearance (not shown) between the outer periphery of the spiral blades and the periphery of the adjacent walls of the barrel is as small as possible (less then 20 mm) and is preferably less than 10 mm.

The shafts 4,4' are preferably operated at a rotation speed of 20 to 150 rpm.

FIG. 4 is an oblique projection of part II of the blades (refer to FIG. 3) showing only some of the spiral blades. In FIG. 4, the spiral blades 5a, 5b and 5a', 5b' attached to each shafts 4,4' are divided into respective sections. This resulting shape of the FIG. 4 configuration resembles the threads of a right- and left-hand screw which is made by cutting left-hand and right-hand threads on the same shaft. As shown in FIG. 4, the blades for feeding forward and those for feeding backward form a pair and engage in a gear-like manner with each other with clearances therebetween.

As described above, the polycarbonate solution fed from an inlet 9 is forcedly transferred forward, namely transferred towards the rear part in the part I of the blades, and then in part II of the blades it gets the repeated action of feeding forward and backward (i.e., limited "to and fro" movement) but moves towards the outlet 10 by being pushed with fed materials introduced from the inlet under the influence of the blades of part I. During these processes, sufficient concentration of the solution and powdering of the polycarbonate, grinding and drying are performed. The process of the present invention thus provides the desired polycarbonate powder continuously in a short period of time.

The polycarbonate solution which can be processed by the present invention is, for example, such polycarbonate as derivatives of 4,4'-dioxydiphenylalkanes, that is polymers using bisphenol A,4,4'-dioxydiphenyl sulfone or halogenated 4,4'-dioxydiphenyl sulfone.

Solvents used for dissolving the polymer are tetrachloroethane, trichloroethane, dichloroethane, trichloroethylene, dichloroethylene, chloroform, methylene chloride, dioxane, tetrahyrofuran, chlorobenzene, toluene, ortho-, meta- or para-chlorobenzene and mixtures of them. Polycarbonate is added to make its concentration 5 to 40 weight percent (wt%) in these solvents.

According to the present invention, precipitants or water is not necessary and thus drying of the powder is very easily accomplished. In addition, the process of the present invention provides many advantages as follows: little depolymerization; good working environment avoiding evolution of small dust particles which may cause a dust explosion; obtaining powder of high bulk density suitable for treatment with extruders and enabling an excellent dispersion of additives.

The present invention is described in further detail by the following example.

EXAMPLE

Polycarbonate of bisphenol A was prepared by a phosgene method, and methylene chloride solution of polycarbonate having a molecular weight of 27,300 was obtained. In said solution, the concentration of the polymer was 7 wt%, which was concentrated to 28 wt% by heating and evaporating the solvent. Using this polycarbonate solution, polycarbonate powder was prepared by the use of the following apparatus.

The barrel 1 was 216 mm in width and 1050 mm in length, having a heating jacket 2 and a jacketed base 3. Shafts 4,4' 60 mm in diameter were mounted horizontally in the barrel 1. To said shafts 4,4', spiral blades of 118 mm in external diameter were attached. The apparatus is made completely of stainless steel. Arrangement of the spiral blades is as shown in FIG. 3 as a development view. In FIG. 3, a blade placement indicated by solid lines is for one shaft and that indicated by dotted or dashed lines is for the other shaft.

The apparatus was heated by passing steam of 150° C through the jacket 2. A continuous feeding of polycarbonate solution at 62 kg/hr was made while rotating the shafts toward each other as seen from the top at 60 rpm. Polycarbonate was held in the barrel for 12 minutes on the average and subsequently was discharged from the outlet 10 as a powder.

Average grain size of the polycarbonate powder thus obtained was 1,700 microns and the contents of the powder having particle size less than 200 mesh was less than 0.3 wt% and no clumps were observed. Bulk density was as high as 0.62 g/cc and the content of methylene chloride in the powder was 18 wt%. No alteration in grain size, bulk density of polycarbonate powder and content of methylene chloride was observed when the feeding rate of polycarbonate solution was changed from 56 kg/hr to 68 kg/hr.

Polycarbonate powder thus obtained was dried for four hours at 120° C and the content of methylene chloride was decreased to less than 0.5 wt% and then mixed well with octyldiphenylphosphite (0.05 wt%) as an antioxidant. The mixture was introduced into the hopper of an extruder (not shown) with a vent having a barrel of 65 mm in diameter and L/D = 22 and was made into pellets after melting at a maximum temperature of 290° C. No coloration of pellets was observed and the antioxidant was distributed uniformly. Upon introducing the powder into the not shown hopper, no dusting occurred and thus no difficulty of operation was observed. The molecular weight of the pellets was 27,100 and therefore depolymerization during the processes of pelleting was negligible.

Polycarbonate powder was made into pellets using the same extruder with a vent as described above without drying the powder, but pellets thus obtained were uniform in grain size and had no color. Therefore, these pellets suffered nothing by comparison with those obtained after the drying process.

What is claimed is:

1. A process for the continuous production of polycarbonate powder from a polycarbonate solution in a processing zone defined by an elongated part-cylindrical barrel member having two elongated shafts therein, the longitudinal axes of said shafts being substantially parallel, said shafts being rotatable about their longitudinal axes and being oriented generally axially of the barrel member, the process comprising:

a. feeding a polycarbonate solution to an inlet at an end portion of said elongated barrel member, said barrel member having an outlet at the end thereof opposite the inlet;

b. rotating said shafts toward each other about their longitudinal axes and forcing the polycarbonate solution toward the outlet by first intermeshing spiral blades mounted on said shafts, said first spiral blades being located on said shafts so that they are located at the portion of said barrel at least adjacent said inlet, said first spiral blades being arranged on said shafts to force the polycarbonate solution received at the inlet toward the outlet end of the barrel with a predetermined extrusion power;

transferring the polycarbonate solution from the first spiral blades to a set of second intermeshing spiral blades mounted on said shafts downstream of the first spiral blades, and set of second spiral blades including a first subset and a second subset;

d. heating and mixing the polycarbonate solution by the set of second spiral blades by producing a limited "to and fro" movement of the polycarbonate solution by means of the set of second spiral blades as the polycarbonate solution is moved toward the barrel outlet under the extrusion power provided by said first spiral blades, a first portion of the first subset of the set of second spiral blades feeding the polycarbonate forward toward the barrel outlet and a first portion of the second subset of the set of second spiral blades feeding the polycarbonate backward toward the barrel inlet to forcedly mix the polycarbonate solution fed into the barrel member and to evaporate and drive off said solvent in said polycarbonate solution under the influence of said heating to thereby concentrate said polycarbonate solution;

e. heating and kneading said concentrated polycarbonate solution in the barrel member by at least second portions of said first and second subsets of spiral blades downstream of said first portions to further evaporate and drive off said solvent in said polycarbonate solution and to form polycarbonate powder particles at least in the vicinity of the outlet of the barrel member;

f. heating and grinding the polycarbonate powder by at least third portions of said first and second subset spiral blades downstream of said second portion and in the vicinity of said outlet of said barrel member to further reduce the particle size of the polycarbonate powder particles and to dry reduced size polycarbonate powder particles; and then g. discharging the ground reduced size polycarbonate powder particles from the outlet of the barrel member under the extrusion power provided by said first spiral blades which provides continuous movement of the materials through the processing zone in said barrel member.

2. The process according to claim 1 wherein the first subset of the set of second spiral blades comprises a plurality of blades on each of said shafts which are spaced axially along the respective shafts, and wherein the second subset of the set of second spiral blades comprises a plurality of blades on each of said shafts and being spaced axially along the respective shafts, the blades of the first and second subsets being alternately arranged along the respective shafts and the blades of said shafts being intermeshed with each other without making mutual contact with each other.

3. The process according to claim 2 wherein said blades of the first and second subset are alternately arranged along each of the shafts and the blades of each of said shafts being intermeshed with each other without making mutual contact with each other.

4. The process according to claim 1 wherein said heating in steps (d), (e) and (f) comprises passing a fluid heating medium through a heating jacket located around at least the portion of the barrel member wherein said shafts are located, the heating jacket extending over at least a major portion of the length of the processing zone in the axial direction of the barrel member.

5. The process according to claim 4 comprising passing steam through the heating jacket.

6. The process according to claim 1 wherein said polycarbonate solution contains a member selected from the group consisting of a polymer of 4,4'-dioxydiphenylalkane, a copolymer of a 4,4'-dioxydiphenylalkane and a halogenated 4,4'-dioxydiphenylalkane, a copolymer of a 4,4'-dioxydiphenylalkane and a 4,4'-dioxydiphenyl sulfone and a copolymer of a 4,4'-dioxydiphenylalkane and a halogenated 4,4'-dioxydiphenyl sulfone.

7. The processing according to claim 1 wherein said polycarbonate solution includes a solvent used for dissolving polycarbonate, said solvent being a member selected from the group consisting of tetrachloroethane, trichloroethane, dichloroethane, trichloroethylene, dichloroethylene, chloroform, methylene chloride, dioxane, tetrahydrofuran, chlorobenzene, toluene, ortho-, meta- or para-chlorobenzene and mixture thereof.

8. The process according to claim 1 wherein the initial concentration of polycarbonate in the solution in step (a) is 5 to 40 weight percent.

* * * * *